UNITED STATES PATENT OFFICE.

KONSTANTIN TARASSOFF, OF MOSCOW, AND PETER SHESTAKOFF, OF PETROGRAD, RUSSIA.

PROCESS FOR OBTAINING HARD PRODUCTS OF CONDENSATION OF PHENOLS AND FORMALDEHYDE.

1,252,507.     Specification of Letters Patent.     Patented Jan. 8, 1918.

No Drawing.     Application filed February 8, 1916. Serial No. 77,081.

*To all whom it may concern:*

Be it known that we, KONSTANTIN TARASSOFF and PETER SHESTAKOFF, residing, respectively, at Moscow and Petrograd, Russia, have invented certain new and useful Improvements Relating to a Process for Obtaining Hard Products of Condensation of Phenols and Formaldehyde, of which the following is a specification.

This invention relates to the production of resinous products by the condensation of phenols and formaldehyde in the presence of small quantities of alkalis, ammonia or organic bases.

As well known phenols and formaldehyde condense together and form masses which are crystalline or amorphous, fusible and soluble in spirit and alkalis or infusible and insoluble, and possess varying degrees of hardness or refractoriness.

In the production of hard, insoluble and infusible resinous masses by the condensation of phenols and formaldehyde in the presence of small quantities of alkalis or ammonia or organic bases, it has been proposed to mix with the reacting materials, solid or liquid extraneous substances to act as fillers or binders or to modify the physical properties or appearance of the mass. The production of a wide variety of compositions may be obtained, it has been stated, by incorporating solid, semi-solid or liquid materials in the resinous product, the addition of such substances being made at any desired stage of the process, either before the reagents are mixed or at any time before or during the final hardening.

In order to modify the characteristics of the product, the addition to phenol formaldehyde condensation products of such materials as castor oil, clove oil, soap or a small percentage of bodies of the paraffin, benzene, and other group, shellac, gums, resins, etc., has been proposed.

In connection with the above mentioned processes it has been stated that the reaction is rendered more complete by heat and that this may be applied in a closed vessel or in a vessel provided with a return condenser in such manner as to avoid any loss of volatile materials.

The employment of a temperature of 100° C. in the initial stage of the condensation process has also been proposed. In the specification of British Letters Patent to Claypoole No. 2122 of A. D. 1908, there is the direction that this stage of the condensation process should be carried out under the action of heat and a temperature of 96° C. has been indicated, by way of example.

The capacity of wood tar to condense with formaldehyde in the presence of alkalis under the action of moderate heat and to produce a powdery material possessing certain curative properties has also been observed, the reaction mixture forming at one stage a viscous mass which becomes solid on cooling and may be cast in molds.

According to the present invention, phenol and formaldehyde are condensed together with other bodies namely, turpentine, or other liquid terpene products, or with wood tar, or coal tar, or non-phenolic oils obtained in the distillation of coal tar, which materials are hereinafter referred to generically as non-phenolic organic bodies, and this condensation is performed in the presence of basic substances at temperatures below the boiling point of the mixture (not higher than 90–92° C.).

It is to be observed that, according to the invention, turpentine or other liquid terpene products, or the tar, or non-phenolic oils are introduced into the reaction mass before the reaction begins.

The condensation reaction progresses perfectly smoothly in vessels of any desired shape, the mass does not separate into layers, and therefore there is no necessity to divide the process into two stages.

The mixture of formaldehyde phenols and alkali together with turpentine or with other liquid terpene product or with coal or wood tar or non-phenolic oils obtained by the distillation of coal tar, in the form of an uniform water solution is carefully heated until the reaction begins. Since, during the reaction, a great quantity of heat is liberated, measures should be taken to prevent the temperature rising above 90°–92° C. and to prevent the mixture boiling and separating into layers.

A proportion of volatile products, principally water, evaporates, the mixture becomes distinctly thick and remains perfectly homogeneous.

When the reaction stops and the liberation of heat no longer takes place, the temperature is slowly raised by heating to 100° and more, while the mixture gradually becomes hard. The heating is continued until the mass changes into a hard, infusible and absolutely insoluble material in the form of a homogeneous transparent or non-transparent mass free from cracks.

The product possesses high dielectric properties and does not change under the action of different chemical agents.

The preparation of different objects therefrom may be effected by two ways; either the material is worked like wood by means of edge tools, or by casting and stamping, in which case not the final product but the intermediate or fusible product is employed which has not lost its capacity to melt and to become plastic and is converted into the final product after it has been shaped.

The aforesaid condensation takes place in presence of basic substances, mineral as well as organic, the employment of which for these purposes is well known; caustic alkalis, ammonia, their carbonic acid salts as well as amins and other organic bases are suitable.

The color and degree of the transparency of the products obtained is dependent not only upon the initial materials but also upon the quality and quantity of alkaline catalytic agents. If comparatively large amounts of alkalis are introduced transparent materials are obtained.

The color of the material for some length of time becomes in the superficial layers darker. It has been observed that when ammonia is employed for condensing, or better, when ammonia and caustic alkalis are employed together, the color of condensation products does not change at all.

Phenol and its higher homologues, cresol, etc., in the crude or in the refined state, may be employed, and instead of formaldehyde its polymers may be used.

The following is given by way of example to illustrate one method of carrying the invention into effect.

A mixture of 288 gr. of crystalline phenol, 48 gr. turpentine, and 350 gr. of commercial 40% formalin is heated in a large glass vessel with continuous stirring until the loss in weight due to the evaporation attains 38–40 gr., and the mixture becomes completely uniform and transparent. The temperature is then lowered to 50° and 18 gr. of a composition, consisting of equal volumes of a 30% solution of sodium hydroxid and ammonia of specific gravity 0.91, is added and the mixture is heated on the water bath to 87°–88°, which temperature is maintained until the total loss due to evaporation is nearly equal to 230–250 gr. Should the temperature due to the spontaneous heating rise above 80°–90°, it is cooled and the temperature is maintained at 82°–85° until the said loss in weight is attained. The mass remains transparent, uniform and comparatively mobile so that it may be poured into molds or test tubes, and the condensation can be continued at a higher temperature which is raised very slowly, namely, during 1–1½ hours, the mass being heated to 91°–93°, then to 94°–96°, the mass changing into an elastic, semi-hard product, which on heating to 105°–110° during 3–4 hours is fully hardened. In order to obtain a harder product the heating is continued to 112° and over. The finished product is yellow or reddish colored, uniform, stable, semi-transparent and insoluble and infusible. If a larger quantity of alkali is taken the ultimate product is as transparent as window glass.

Example 2: 300 gr. of commercial light cresol, 48 gr. turpentine and 330 gr. commercial formalin, are carefully mixed in a glass vessel and heated on a water bath until the loss in weight due to evaporation reaches 45–50 gr. Then at a temperature of 65°–70° C. 36 gr. of a mixture consisting of equal volumes of 30% solution of caustic soda and of ammonia of specific gravity 0.91 is added.

The temperature of the interacting mixture rises and when it attains 90°–95° it is cooled to 82°–84° and is maintained at this temperature under continuous stirring until the loss of weight of the mixture due to the evaporation attains 240–260 gr. The uniform transparent mass is then heated to a higher temperature as in example 1. The final product is a hard, compact and very strong material, the color of which is light yellow or darker, according to the color of the cresol.

If in this example instead of turpentine, coal tar or charcoal tar is taken, and all other conditions above referred to are kept, similar products having a brown or dark color are obtained.

What we claim is:—

1. The process of obtaining hard, infusible and insoluble condensation products of formaldehydes with phenols, which comprises causing phenol and formaldehyde and a non-phenolic organic body to react together in the presence of an accelerator having an alkaline reaction, and causing the initial stages of the reaction to take place at temperatures below the boiling point of the mixture.

2. The process of obtaining hard, infusible and insoluble condensation products of formaldehydes with phenols, which comprises causing phenol and formaldehyde and a liquid terpene product to react together in the presence of an accelerator having an alkaline reaction, and causing the initial stages of the reaction to take place at temperatures below the boiling point of the mixture.

3. The process of obtaining hard, infusible and insoluble condensation products of formaldehydes with phenols which comprises causing phenol and formaldehyde and turpentine to react together in the presence of an accelerator having an alkaline reaction, and causing the initial stages of the reaction to take place at temperatures below the boiling point of the mixture.

In testimony whereof we affix our signatures in presence of two witnesses.

KONSTANTIN TARASSOFF.
PETER SHESTAKOFF.

Witnesses:
BORIS MOZSIK,
R. LOVIAGHIN.